July 24, 1951 W. A. SCOTT ET AL 2,562,066
CAN HOIST
Filed April 14, 1949 2 Sheets-Sheet 2
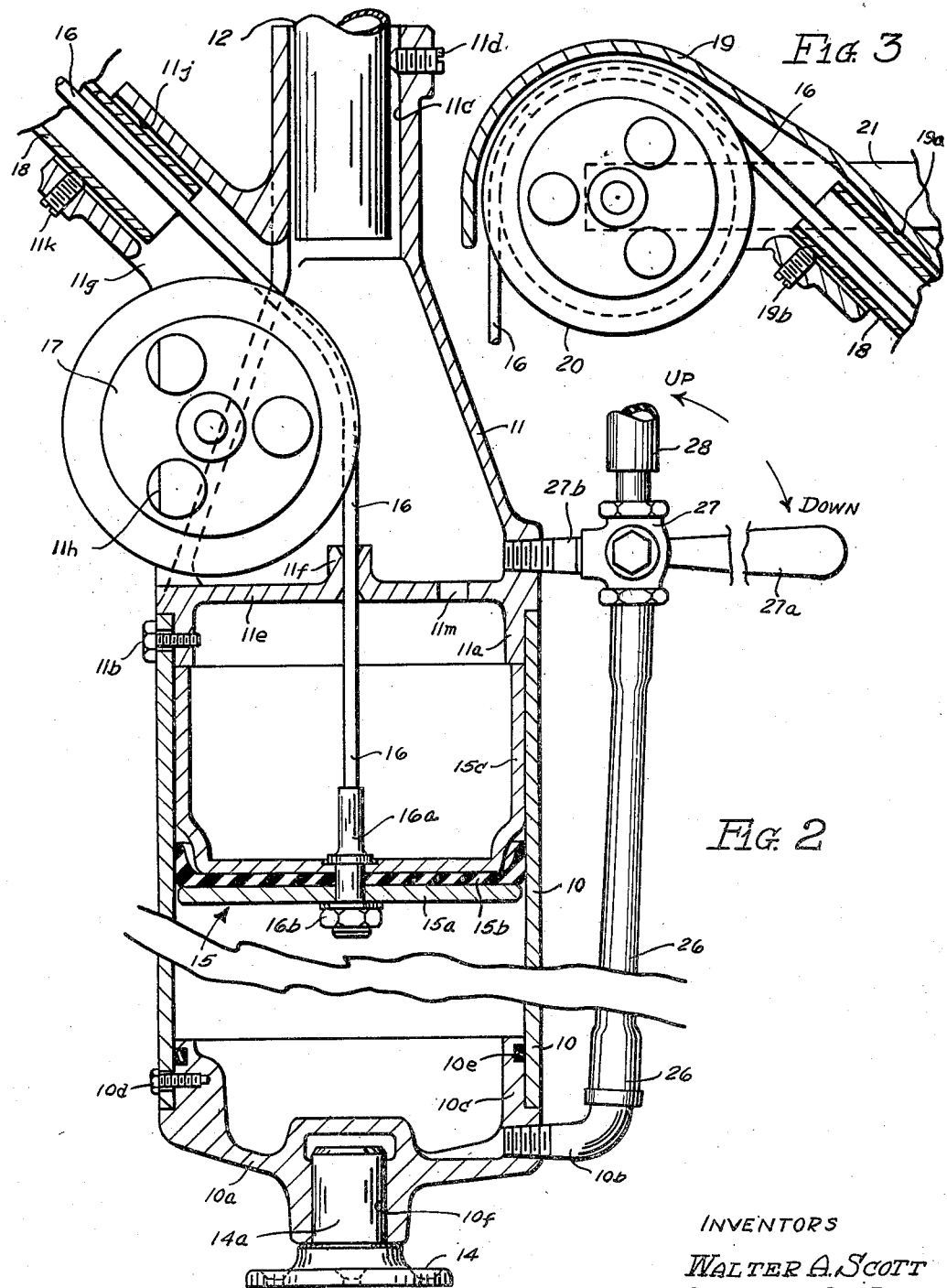
INVENTORS
WALTER A. SCOTT
JAMES E. COOK
BY
Davis, Hoxie & Faithfull
ATTORNEYS Patented July 24, 1951

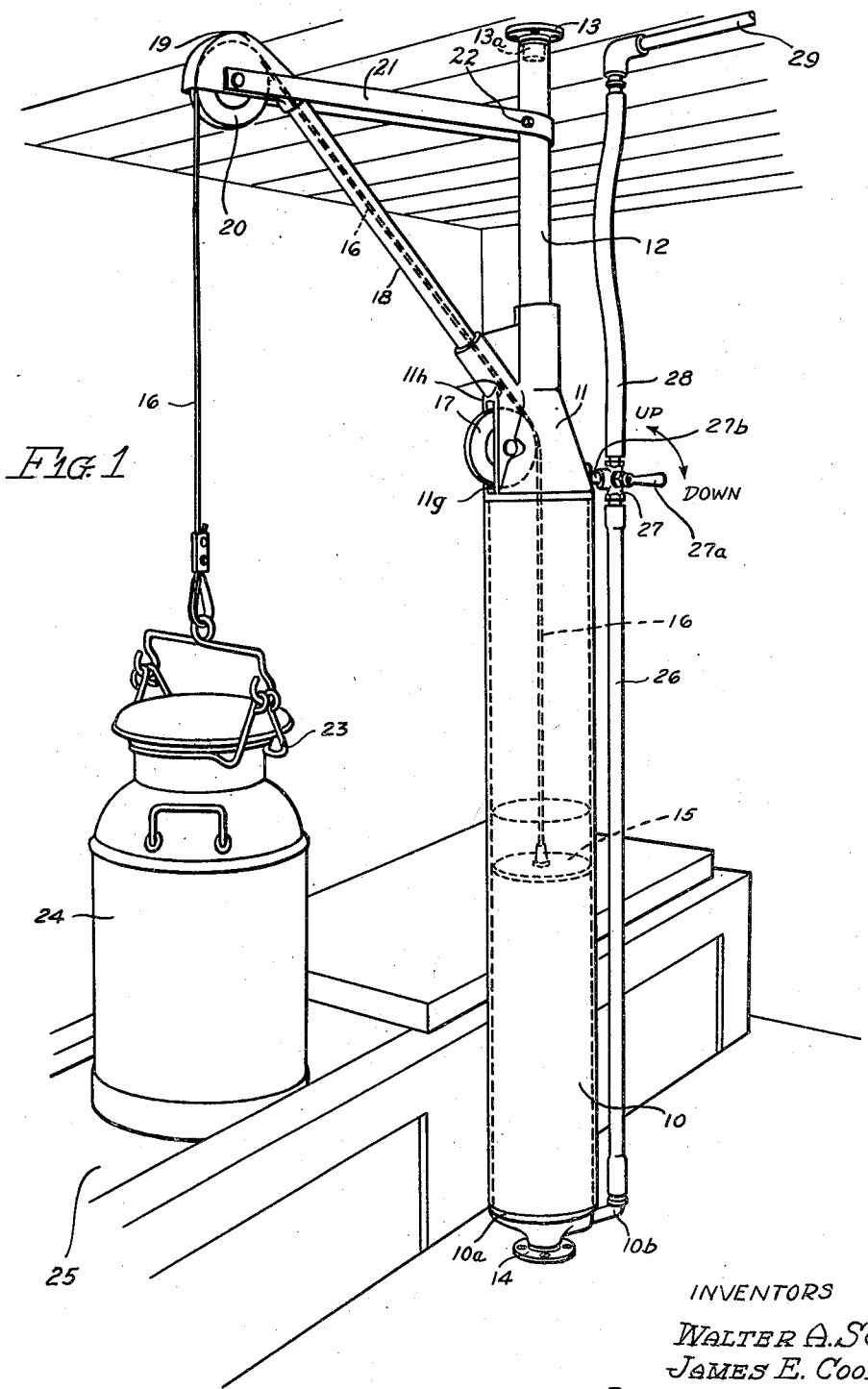

2,562,066

UNITED STATES PATENT OFFICE 2,562,066

CAN HOIST

Walter A. Scott and James E. Cook, Poughkeepsie, N. Y., assignors to The De Laval Separator Company, New York, N. Y., a corporation of New Jersey Application April 14, 1949, Serial No. 87,458

7 Claims. (Cl. 212—31)

This invention relates to mechanical hoists and more particularly to hoists suitable for operation from the vacuum line of a milking machine.

The hoist of the present invention is of the general type disclosed in an application of Seldon H. Hall, Serial No. 714,247, filed December 5, 1946, now Patent No. 2,476,192 granted July 12, 1949. Its main components are a cable and pulley arrangement operable from a milking machine vacuum line by a piston in a cylinder, and a control valve which may be selectively positioned to connect the cylinder interior to the vacuum line or to atmosphere, whereby the free end of the cable may be raised or lowered, respectively. The pulley arrangement and the cylinder can swing together about a vertical support.

The new hoist, while retaining all of the operating features of the hoist disclosed in the above-noted application, has been made more economical to manufacture and easier to assemble and install. In addition, the personal injury hazard to the operator has been practically eliminated.

An object of the invention is to provide a pneumatically operated hoist having a minimum number of parts, and which is quick and easy to assemble.

Another object is to provide a pneumatically operated hoist which can be used with complete safety.

A hoist made in accordance with the invention comprises a hollow rotary supporting column forming a hoist cylinder which contains a free-floating piston. On the top of the column is a hollow head which is connected to and derives lateral support from a vertical member projecting upwardly from the head and disposed on the rotation axis of the column. The head supports a pair of pulleys, one of which is located adjacent the rotation axis of the column, and the other of which is remote from this axis. A cable extends upward from the piston and into the head, where it passes over the first pulley, and thence outward from the rotation axis of the column and over the second pulley. The end of the cable depending from the second pulley may be provided with a hook, or the like, for holding an object to be hoisted. A pipe line communicates with the interior of the column and has a valve for controlling the flow of an operating fluid, preferably air, through the line to raise and lower the piston.

In the preferred construction, the head on the column is provided with two sockets, one of which is disposed on the rotation axis and receives the lateral supporting member. The other socket extends laterally from the rotation axis and communicates with the interior of the head. The pulley adjacent the rotation axis is located at least partly within the head and positioned so that the rotation axis and the axis of the laterally extending socket are tangent to the periphery of the pulley. In this way, the pulley serves to guide the cable from the piston into the laterally extending socket, so that the part of the cable below the pulley is on the rotation axis. A hollow arm is secured in the laterally extending socket, and the cable extends from the socket through the arm to the second pulley which is mounted on the outer end of the arm, where it may be provided with a protective housing.

With this construction, the use of a rigid piston rod is avoided, and the cylinder for the piston forms the vertical support of the hoist. The head on the column can be made as a unitary structure and serves to support the pulley system and also to give lateral support to the column through the vertical supporting member connected to the head. Moreover, the cable is completely enclosed between the piston and the pulley from which the cable depends, this enclosure being provided by the column, the head and the hollow arm on the head. Additionally, one of the pulleys is protectively sheathed by the head itself, and the other pulley may be provided with a protective housing mounted on the hollow arm.

For a better understaning of the invention, reference may be had to the accompanying drawings, in which:

Fig. 1 is a perspective view of a preferred form of the new hoist;

Fig. 2 is an enlarged vertical sectional view of the hollow supporting column, the free-floating piston therein and the head on the column, and Fig. 3 is a vertical sectional view, on a reduced scale, of the second pulley mounted on the hollow arm.

Referring to the drawings, the hoist comprises a hollow rotary supporting column 10 forming a hoist cylinder. At its lower end, the column rests upon a base 10a having a nipple 10b for passage of an operating fluid, preferably air, to and from the interior of the column through the base. A flange 10c on the base fits closely into the lower end of the column, the column being releasably secured to the base by a screw 10d extending through a hole in the column and threaded into the flange 10c. The latter carries a rubber ring 10e compressed against the inner wall of the column and by which the connection between the column and its base is sealed.

On the top of the column 10 is a hollow structure or head 11 having a depending flange 11a which fits closely in the upper end of the column. The head 11 is releasably secured to the column by a screw 11b extending through the column wall and threaded into the flange 11a. At its upper end, the head 11 is provided with a hollow extension or socket 11c disposed on the rotation axis of the column and alined vertically with a socket 10f in the base. A set screw 11d on the socket 11c forms a clamping device for releasably securing a vertical member 12 in the socket. The top of the column derives lateral support from the member 12 through the head 11, the supporting member 12 being held at its upper end by a plate 13 secured to the ceiling and having a stud 13a projecting into the member 12. The base 10a of the column is supported by a plate 14 having a stud 14a projecting into the socket 10f. Thus, the column 10 is rotatable about the studs 13a and 14a on a vertical axis.

Within the column 10 is a free-floating piston 15 comprising a lower plate element 15a, a rubber sealing disc 15b, and an upper element 15c in the form of a hollow drum, all of which are held together as a unit by a central pin 16a secured at its upper end to a cable 16. The lower end of the pin 16a has a nut 16b by which the parts 15a, 15b and 15c are clamped against a shoulder on the pin. The side wall of drum 15c is of sufficient length to guide the assembled piston and prevents binding or tilting of the same within the cylinder due to the pull on cable 16.

From the piston 15, the cable 16 extends upward through a horizontal wall 11e at the bottom of the head and thence into the interior of the latter. As shown, the bottom wall 11e has a central boss 11f provided with an opening for the cable, whereby the cable is guided on the rotation axis as a further aid in preventing tilting of the piston 15. Within the head 11, the cable passes over a pulley 17 rotatably mounted in a vertical slot 11g formed between opposed webs 11h on the head, the webs serving to support the pulley axle. From pulley 17, the cable extends upward and outward through a hollow extension or socket 11j integral with the head and projecting at an angle to the vertical socket 11c. The pulley 17 is so positioned that part of its periphery engaged by the cable is on the rotation axis while another part engaged by the cable is on the axis of socket 11j. Thus, the aforementioned axes are tangent to the periphery of the pulley, part of which is located at approximately the intersection of these axes. A hollow arm 18 is releasably held at one end in the socket 11j by means of a clamping device or set screw 11k on this socket. On the other or outer end of arm 18 is a housing 19 having a socket 19a in which the arm is releasably secured by a clamping device or set screw 19b. A pulley 20 is rotatably mounted in the housing 19 with part of the pulley periphery tangent to the common axes of the socket 19a and the arm 18. The hollow arm 18, which may be a pipe, is supported at its outer portion by parallel braces 21 attached to the axle of pulley 20 and extending along the outside of housing 19 to a clamp 22 on the vertical member or pipe 12.

The cable extends from the head socket 11j through the hollow arm 18 and socket 19a into housing 19, where it passes over the pulley 20, and thence downward through the bottom of housing 19. Its free end is connected to a grapple 23 adapted to fit around the neck of a milk can 24 which is to be placed into or removed from a cooler 25. The grapple 23 illustrated is of the construction disclosed in S. F. Hall application Serial No. 635,181, filed December 15, 1945, now Patent No. 2,481,923 granted September 13, 1949.

Piston 15 is moved downwardly in the cylinder 10 to raise the free end of cable 16. The piston is motivated by a pressure differential in the cylinder or column 10 and, in the embodiment shown, this is derived from the vacuum line 29 of a milking machine. More particularly, the nipple 10b on the column base 10a is connected to a pipe line including a pipe 26 which extends upwardly from the nipple along the column wall to a valve 27 having a two-position control handle 27a. In the "up" position of this handle, the pipe 26 is connected through the valve to a flexible hose 28 extending with a substantial amount of slack between the valve and the vacuum line 29. In the "down" position of handle 27a, the pipe 26 is disconnected from hose 28 and connected through the valve to a short duct 27b communicating with the interior of housing 11. The duct 27b serves to admit atmospheric air into pipe 26 and also affords lateral support for pipe 26 and valve 27. Since valves adapted to effect the above connections selectively are well known, it is unnecessary to describe or illustrate the details of valve 27.

The overall height of the vertical support for the assembled hoist may be adapted to any ceiling height by cutting pipe 12 to a length suitable to reach from the bottom of socket 11c in housing 11 to the plate 13, sufficient clearance having been provided within the upper tapered portion of housing 11 to permit the pipe 12 to be lowered therein so that the upper end of the pipe can clear the stud on plate 13. After pipe 12 has been placed over the upper stud 13a, it is locked in position by screw 11d.

In the operation of the hoist when it is desired to lift the milk can 24, the cable 16 is affixed to the can, as by means of grapple 23, and the handle of valve 27 is moved to the "up" position indicated in Figs. 1 and 2. Air is exhausted from the lower end of column 10 beneath piston 15 through nipple 10b, pipe 26, valve 27, and hose 28 to the milker vacuum line 29. As a result, atmospheric pressure entering the column through a passage 11m in head wall 11e acts upon the top of piston 15 to move the same downward in the column. Cable 16, being affixed to the piston, is pulled into the column and the free end is thus elevated to lift the can 24. When the piston 15 has moved to the bottom of the column 10, the can may be swung in a horizontal plane on the arm 18, it being understood that the column 10, head 11 and pipe 12 are rigidly inter-connected and rotate as a unit with the arm 18.

To lower the can 24, the handle of valve 27 is moved to the "down" position. Air at atmospheric pressure then flows through duct 27b, valve 27, pipe 26, and nipple 10b to the lower end of the column, and the weight of the can operating through cable 16 will cause piston 15 to move upwardly in column 10. Since the only air escape from that portion of column 10 above the piston is through passage 11m, and possibly around the loose fit of cable 16 within the hollow boss 11f, the compression of air in the upper portion of the column will act to retard the upward movement of the piston and have a throttling effect so as to prevent the milk can from descending too rapidly. The head flange 11a serves as a stop for limiting upward movement of the piston in the column.

It will be observed that the improved hoist is of simple construction and may be quickly and easily assembled. The use of the free floating piston eliminates the usual rigid piston rod extending through at least one head of the cylinder. The hoist cable is completely enclosed except for the depending free end portion to which an article to be raised or lowered is attached. Thus, the personal injury hazard to an operator from accidental contact with the cable has been greatly reduced if not, for all practical purposes, entirely eliminated. Because of the one-piece head 11, the assembly of the component parts has been greatly facilitated and it is possible to utilize the hoist cylinder proper as part of the rotatable vertical support for the assembled hoist. It is to be noted also that the pulleys necessary for the operation of the hoist are substantially enclosed, thus further decreasing the operator injury hazard.

We claim:

1. A hoist comprising a hollow column closed at its lower end, a bottom support for the column on which it is rotatable about a vertical axis, a hollow head removably mounted on the upper end of the column, the head having a pair of extensions one of which is disposed on said axis and the other of which is hollow and has an axis extending laterally from said first axis, a member connected to said first extension for supporting the head laterally, a hollow arm connected to the hollow extension, a pulley mounted in the head and having part of its periphery at the intersection of said axes, a second pulley mounted on the outer end of the arm, a free-floating piston in the column, a pipe line communicating with the interior of the column, a valve in the pipe line for controlling the flow of an operating fluid through the line to raise and lower the piston, and a cable extending upwardly from the piston into the head, over said first pulley, through the hollow extension and arm, and over the second pulley.

2. A hoist comprising a hollow rotary column open at the top and bottom, a base releasably secured to the bottom of the column and sealed thereto, a bottom support on which the base is rotatable, a pipe line connected to the base and communicating through the base with the interior of the column, a hollow head releasably secured to the top of the column, a pulley mounted in the head, a member connected to the head and supporting the head laterally for rotation with the column, an arm projecting from the head at an angle to said member, a pulley mounted on the arm, a piston in the column, a cable extending upwardly from the piston into the head, where it passes over said first pulley, and thence outward along the arm and over the second pulley, and a valve in said pipe line for controlling the flow of an operating fluid through the line to raise and lower the piston.

3. For use in a hoist having a hollow rotary supporting column forming a hoist cylinder, a piston in the column, and a cable extending upwardly from the piston, a head for the column, the head comprising a hollow structure, a pair of sockets on said structure having intersecting axes, one of the sockets opening upwardly for receiving a lateral support for the head, the second socket extending at an angle to the first socket and communicating with the interior of said structure to receive the cable, and a pulley mounted in said structure and positioned with said axes tangent to the periphery of the pulley, the pulley being adapted to engage the cable and guide it from the piston to said second socket.

4. A head for use on a hollow column of a hoist, as defined in claim 3, comprising also a bottom wall having a cable opening for guiding the cable between the piston and the pulley.

5. In combination with a head as defined in claim 3, a hollow arm in the second socket and adapted to receive the cable therefrom, and releasable clamps on the sockets engageable with said arm and lateral support, respectively.

6. A hoist comprising a hollow column rotatable about a vertical axis and closed at its lower end, a head on the column, a member projecting upwardly from the head for supporting it laterally, the head having two sockets disposed at an angle to each other, one of the sockets being disposed on said axis and receiving said lateral supporting member, a hollow arm in the second socket, a pair of pulleys supported by the head, one of the pulleys being located adjacent said axis and the other pulley being remote from said axis, a free-floating piston in the column, a cable extending upward from the piston and into the head, where it passes over said first pulley, and thence outward from said axis through said second socket and the arm and over the second pulley, a pipeline communicating with the interior of the column, and a valve in the pipeline for controlling the flow of an operating fluid through the line to raise and lower the piston.

7. A hoist according to claim 6, comprising also a housing for the second pulley on the outer end of the arm.

WALTER A. SCOTT.
JAMES E. COOK.

REFERENCES CITED

The following references are of record in the file of this patent:

UNITED STATES PATENTS

| Number | Name | Date |
|---|---|---|
| 505,654 | Hale | Sept. 26, 1893 |
| 747,220 | Read | Dec. 15, 1903 |
| 1,584,117 | Mitchell | May 11, 1926 |
| 1,705,431 | Weed | Mar. 12, 1929 |
| 2,239,298 | Kraut | Apr. 22, 1941 |
| 2,446,488 | Pierce | Aug. 3, 1948 |